United States Patent [19]

Farb

[11] 3,953,910

[45] May 4, 1976

[54] ANCHORING METHOD AND ARTICLE

[76] Inventor: Arthur Farb, P.O. Box 447, North Massapequa, N.Y. 11758

[22] Filed: Feb. 12, 1975

[21] Appl. No.: 549,138

[52] U.S. Cl. .................................. 24/13; 40/1.5; 156/298
[51] Int. Cl.² ..................... A44C 3/00; A45F 5/02; B32B 31/00
[58] Field of Search ........... 24/13, 90 A, 90 W, 103, 24/11 F, 11 M, 11 P, 90 HA; 40/1.5, 1.6; 156/298, 303.1, 311; 264/271, 273

[56] References Cited
UNITED STATES PATENTS

| | | | |
|---|---|---|---|
| 1,407,474 | 2/1922 | Nielsen | 24/11 P |
| 2,153,157 | 4/1939 | Priesmeyer | 24/103 X |
| 2,209,714 | 7/1940 | Chernow | 24/103 UX |
| 2,237,152 | 4/1941 | Larmour | 156/303.1 |
| 2,247,558 | 7/1941 | Nichols | 156/303.1 |
| 2,267,038 | 12/1941 | Mix | 264/271 X |
| 2,418,410 | 4/1947 | Hull | 24/11 P UX |
| 2,770,864 | 11/1956 | Weese | 264/273 X |
| 3,212,204 | 10/1965 | Smith | 40/1.5 |
| 3,257,747 | 6/1966 | Schimmel | 40/1.5 |
| 3,323,966 | 6/1967 | Schimmel | 156/298 |
| 3,466,773 | 9/1969 | Kessler | 40/1.5 |
| 3,676,967 | 7/1972 | Frati | 52/220 |
| 3,810,321 | 5/1974 | Kiba | 40/1.5 |

Primary Examiner—Donald A. Griffin
Attorney, Agent, or Firm—Natter & Natter

[57] ABSTRACT

An anchor for securement to a base having a transitory fluent stage includes a sheetlike segment with an interior zone having a depressed loop. The loop is pressed into a fluent area of the base with the fluent material flowing completely around the loop. Upon solidification of the base, a secure interlock is achieved. A typical anchor may be a pin or other attachment finding for an article of decorative or functional ornamentation such as an identification badge, jewelry, or the like, with the article of ornamentation being formed of a thermoplastic.

11 Claims, 5 Drawing Figures

ANCHORING METHOD AND ARTICLE

BACKGROUND OF THE INVENTION

1. Field of the Invention

The invention relates generally to methods of securement such as anchoring one material to another through utilization of an embedment. More particularly, the invention deals with a method of securing a finding to an article of ornamentation and the composite article so formed.

2. Brief Description of the Prior Art

A significant problem in the manufacture of articles of decorative or functional ornamentation such as badges, pins, cufflinks, etc., has been the difficulty in achieving an economical yet satisfactory securement between the article body and a finding such as a pin or post. Many prior approaches toward securement between the main body of the article of ornamentation and the finding employed the use of various adhesive mediums such as solvents, solder, or through interlocking engagements such as the seating of a portion of the finding in a groove or channel or the use of bendable tabs.

Attempts at bonding a metallic element having means for supporting an ornament in wearing position to a thermoplastic ornamentation were exemplified by U.S. Pat. No. 2,014,414, which disclosed the softening of a thermoplastic sheet through the use of heat and compressing the metallic element into the softened surface such that a bead of thermoplastic was formed around the edges of the metallic element. The bead served to interlock the metallic element to the thermoplastic body.

Among the disadvantages inherent in the technique of securement employing a peripheral bead of solidified thermoplastic was that the bead often did not freeform over the peripheral edge of the metallic element and thus only a weak bond resulted. In order to achieve a peripheral overlap of molten thermoplastic beyond the peripheral edge of the metallic element, it was necessary to embed the metallic element deep into the thermoplastic body. Even with increased peripheral flow, optimum bonding was only achieved with a subsequent forming step forcing the beaded edge into a position which overlapped a marginal zone of the element. This was usually accomplished with a heated burnishing tool and tended to result in an unsightly appearance.

A disadvantage of increased penetration of the element into the body to increase the flow of thermoplastic was that care had to be taken if the obverse face of the thermoplastic body was to be engraved. The engraver was required to control the depth of engraving tool penetration so as not to cut too deeply into the body to thereby avoid exposure of the embedded element.

Even with the additional step of burnishing the peripheral bead to achieve an overlap, the bond between the element and the thermoplastic body was subject to dislodgement resulting from nicking or chipping of the bead during use and even from a spreading of the bead without fracture to release the element.

SUMMARY OF THE INVENTION

An anchor element having a sheetlike segment including two mating slits along an interior zone and with the segment being depressed into a closed loop between the slits is bonded to a base or body having a transitory fluent stage by embedding the loop into a fluent area of the body and allowing base material to flow over and completely around the loop. Upon solidification, an interlocking engagement between the element and the body is achieved.

Typically, the method may be employed to anchor a pin or post finding to an ornamentation body formed of thermoplastic. Localized heating of the body to a fluent stage and embedment of the loop can be achieved by heating the element and simultaneously applying compressive pressure between the body and the element with the loop in abutment against the body. Heated by the loop, the thermoplastic melts to permit loop penetration and flows over and around the loop. Heat and pressure are removed after the thermoplastic flow encircles the loop.

From the foregoing, it will be appreciated that it is an object of the present invention to provide an anchoring method, an anchoring element, and an anchored article of the general character described which, however, are not subject to any of the aforementioned disadvantages.

It is a further object of the present invention to provide an anchoring method and articles which are practical, economical, lend themselves to mass fabrication techniques, are commercially feasible and low in cost.

It is a further object of the present invention to provide an anchoring method of the general character described which provides a strong, firm, durable bond capable of withstanding the rigors of constant use.

Yet another object of the present invention is to provide an anchoring method of the general character described which employs but a modicum of operating steps.

A further object of the present invention is to provide an anchoring method of the general character described wherein a firm and secure interlocking engagement is achieved between an anchoring element and a base material without the necessity of utilizing intermediate adhesives, solvents, or bonding agents.

Yet a further object of the present invention is to provide an anchoring method of the general character described wherein a sheetlike anchoring segment of one piece construction is secured in interlocking united engagement to a base having a transitory fluent state without inlayment of the sheetlike segment into the base.

Another object of the present invention is to provide an anchoring method for bonding an element to a base wherein the base material flows completely around a loop formed in the element and solidifies in interlocked engagement.

A further object of the present invention is to provide an anchoring element suitable for simple yet efficient securement to a material having a transitory fluent stage.

Yet another object of the present invention is to provide a method of bonding a finding and a badge base formed of a thermoplastic, which method permits the subsequent engraving of the badge while minimizing the potential of exposing the finding during engraving.

A still further object of the present invention is to provide a bonded article of the general character described wherein a secure, rigid, adhesive-free, interlocking engagement is achieved between a base material and an element.

Other objects of the invention in part will be apparent and in part will be pointed out hereinafter.

With these ends in view, the invention finds embodiment in certain combinations of elements, arrangements of parts, and series of steps by which the said objects and certain other objects are hereinafter attained, all as fully described with reference to the accompanying drawings, and the scope of which is more particularly pointed out and indicated in the appended claims.

BRIEF DESCRIPTION OF THE DRAWINGS

In the accompanying drawings in which are shown some of the various possible exemplary embodiments of the invention and one of the steps employed in practicing the invention.

DESCRIPTION OF THE PREFERRED EMBODIMENTS

Figure 1:
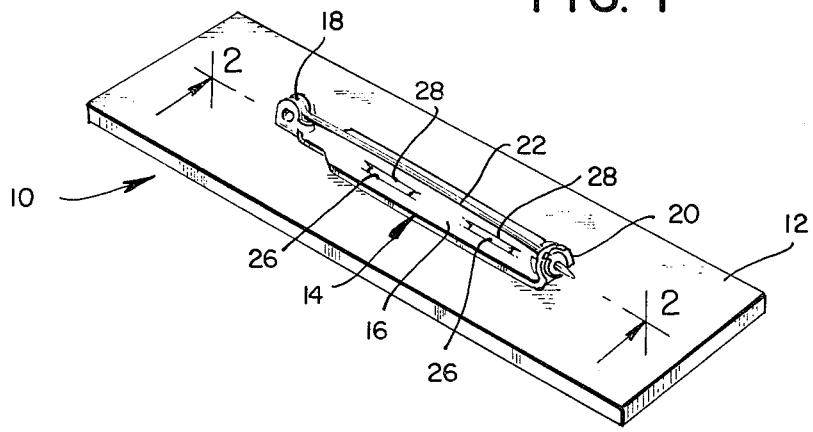
FIG. 1 is a perspective view of a typical badge constructed in accordance with the invention and illustrating a pin finding anchored to a thermoplastic badge body.

Referring now in detail to the drawings, the reference numeral 10 denotes generally a badge 10 constructed in accordance with and embodying the invention. The badge 10 includes a base or body 12 which is formed of thermoplastic material, e.g. polyethylene, polypropylene, polyvinyl chloride, acrylonitrile-butadiene-stryrene, polyamid, cellulosics, etc., and is shown for the purpose of illustration only as having a generally rectangular shape. Badges, as well as any other articles of ornamentation, be they functional or purely decorative, which are to be worn are supported in wearing position through the utilization of various fastening means generally termed findings. Accordingly, the badge 10 is illustrated as having a base or body 12 to which a finding 14 is anchored.

Figure 2:
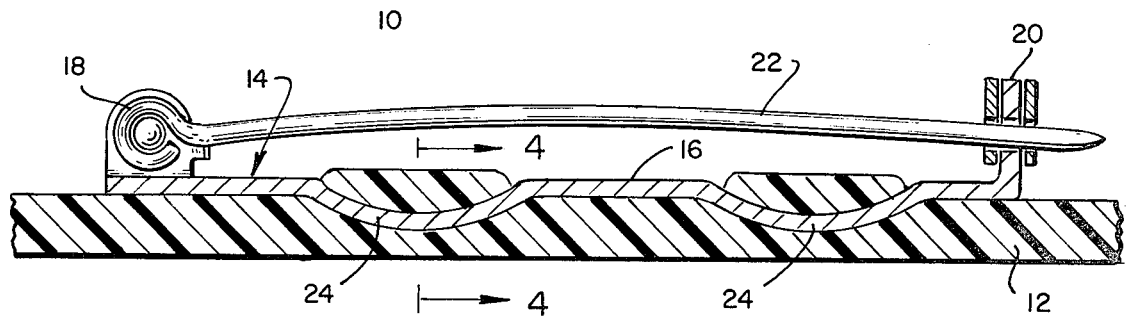
FIG. 2 is an enlarged sectional view taken substantially along the line 2—2 of FIG. 1 and illustrates an interlocking engagement between a pair of loops depending from the finding and the body which surrounds the loops.

With reference now to FIG. 2, the finding 14 is shown in enlarged detail as comprising a generally sheetlike abutment segment or element 16 of elongated configuration having a pin hinge 18 at one end thereof and a safety latch 20 at the other end. A pin 22 is pivoted at the hinge 18 for selective engagement in the latch 20 for the purpose of securing the badge 10 to an article of clothing or other supportive surface, all in a typical manner well known to those skilled in the art.

Figure 4:
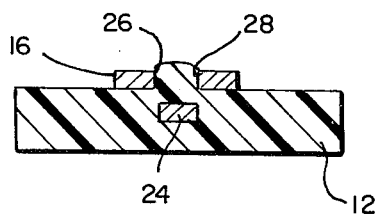
FIG. 4 is a sectional view similar to that of FIG. 3 through the completed badge, the same being taken substantially along the line 4—4 of FIG. 2.

In accordance with the invention, an interior zone of the abutment segment 16 is deformed so as to provide anchoring means for interlocking engagement with the base 12. As can be more clearly seen from the sectional illustrations of FIGS. 2 and 4, the anchoring means includes a pair of closed loops or lugs 24 swaged or stamped from the abutment segment 16. The transverse width of each loop 24 is defined by two substantially parallel registered slits 26, 28 extending through the abutment segment 16. The loops 24 are thus formed as a continuous depression of a zone of the segment 16.

The finding 14 is typically formed of metal such as brass, steel, etc., which will readily conduct heat for the purpose to be hereinafter described and which maintains its shape at temperatures wherein the thermoplastic body 12 will be fluent.

To assemble the badge 10 in accordance with the novel method of this invention, the finding 14 is placed in a desired position along a face of the base 12 with the abutment segment 16 substantially parallel to the base and with the lugs 24 abutting the base. The finding 14 is heated to a temperature sufficient to melt the particular thermoplastic of which the base 12 is formed, and compressive pressure is applied between the finding 14 and the base 12 urging the abutment segment 16 toward the base. Local melting of the base 12 occurs in zones contacted by the loops 24, and due to the force applied, the loops begin to embed in the body with displaced fluent thermoplastic material 30 oozing upwardly around the loops 24.

Figure 3:
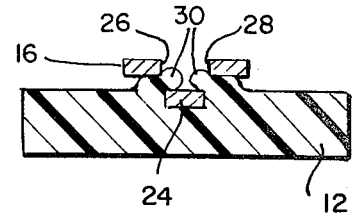
FIG. 3 is an enlarged transverse sectional view through the badge body and finding taken substantially at the midlength of a loop with portions of the finding deleted for clarity and illustrating the step of implanting the loop into the body.

The fluent thermoplastic 30 rises toward the descending segment 16 contacting the undersurface of the segment 16 and the edges of the slits 26, 28 on the undersurface of the abutment segment 16 as illustrated in FIG. 3. This contact tends to spread the thermoplastic 30 and urges the fluent thermoplastic inwardly from opposed edges of the loops.

Downward pressure is continued until the undersurface of the abutment segment 16 is seated against the base 12 at which stage the fluent thermoplastic 30 overlapping the loops 24 from each edge unite encircling the loops and filling cradle or well areas between the loops and the abutment segment and occupying open spaces in the upper face of the segment between the slits 26, 28.

The distance between the upper surfaces of the loops 24 and the undersurface of the abutment segment 16 is approximately equal to the thickness of the segment 16. It is desirable that the volumetric displacement of fluent thermoplastic is sufficient to form a unified mass in the cradle area above the loops 24 and the open spaces between the slits simultaneously with the seating or abutment of the segment 16 against the base 12. In practicing the method, the operator terminates the application of pressure when the open spaces between the slits are filled with thermoplastic. In actuality, a slight amount of fluent thermoplastic does not enter the cradle area and spreads away to form a thin flash upon which the abutment segment 16 is seated.

Upon the seating of the abutment segment 16 with the simultaneous congealment of fluent thermoplastic in the cradle area, the application of heat is discontinued and the zones of fluent thermoplastic are permitted to solidify to thereby provide a unified interlocking engagement. Since the flash is concealed by the segment 16 and all other molten thermoplastic is united in the cradle area, the bond results in a neat, finished appearance.

After anchoring the finding 14 to the badge body 12, the badge 10 may be thereafter engraved on the opposite face without the hazard of inadvertent exposure of the finding since the lugs 24 are embedded to uniform depth.

Figure 5:
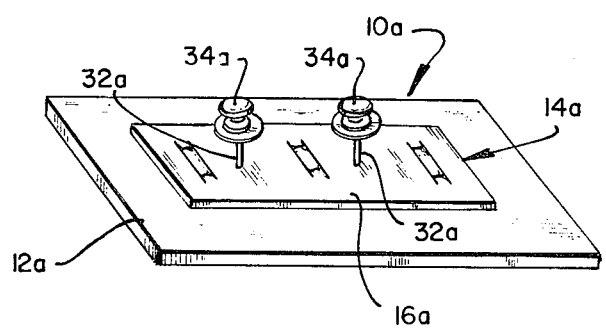
FIG. 5 is a perspective illustration of an alternate embodiment of a badge having a modified finding.

A further embodiment of the invention constructed in accordance with the method is illustrated in FIG. 5 wherein like numerals designate like components as in the embodiment of FIGS. 1–4, however bearing the suffix a. A badge 10a is shown with a base 12a having a finding 14a anchored thereto. The finding 14a includes an abutment segment 16a having three depending loops for anchoring in accordance with this invention through the interlocking engagement between the loops and the base in a manner identical to that previously described with reference to the embodiment shown in FIGS. 1 through 4. The finding 14a, however, is shown as including a military post-clutch type engagement in lieu of the safety pin engagement of the previous embodiment. A pair of pins or posts 32a extends from the segment 16a in a direction opposite to that of the loops. To mount the badge 10a on a uniform, for instance, the posts are impaled through the uniform and a clutch cap 34a is secured over the post end in a conventional manner. The posts may be threaded and the cap matingly threaded for alternate engagement.

While the present invention has been illustrated in an exemplary manner with respect to safety pin and post type clothing engagement findings, the invention relates to the anchor between the findings and the body and the particular nature of the attachment between the finding and any other support does not form part of this invention.

Additionally, the number of loops which depend from the abutment segment may be varied so that numerous additional interlocking engagements between a finding and a base may be provided in an application wherein additional bonding strength is required.

It should be understood that the anchoring method of the present invention is applicable not only to instances wherein an element is to be joined to a thermoplastic material but may be equally utilized when anchoring an element to any material having a transitory fluent state or stage and which subsequently solidifies. For example, segments having loops or lugs of the present invention could be anchored to bodies formed of epoxy resin by being depressed into the body when it is in its fluent state. The segment is held in a fixed position with the loops embedded in and completely surrounded by the body until the resin attains its initial set. Similarly, various building or construction materials could be anchored to fluent cement bodies on construction sites in accordance with the method of the present invention. Further, it should be understood that the present method could be employed to join two metal articles with the metal body having a lower melting temperature than the metal segment from which the loops project.

Thus, it will be seen that there is provided an anchoring method and articles which achieve the various objects of the invention and which are well adapted to meet the conditions of practical use.

Since various possible embodiments might be made of the present invention and since various changes might be made in the exemplary embodiments and steps above set forth, it is to be understood that all matter herein described or shown in the accompanying drawings is to be interpreted as illustrative and not in a limiting sense.

Having thus described the invention, there is claimed as new and desired to be secured by Letters Patent:

1. A method of constructing an article of ornamentation having a thermoplastic body, said method comprising
   a. providing a finding having a sheetlike segment with a depressed loop,
   b. heating the loop to a temperature at least the melting point of the thermoplastic such that a zone of the thermoplastic body adjacent the loop will change to a fluent state,
   c. applying a compressive force between the loop and the body to permit the loop to embed into the body,
   d. allowing the fluent thermoplastic to be displaced by the loop and overlap the longitudinal edges of the loop,
   e. discontinuing the compressive force after the fluent thermoplastic has passed through the loop, and
   f. allowing the fluent thermoplastic to solidify in interlocking engagement through the loop,
   whereby the finding is securely anchored to the body.

2. A method of constructing an article of ornamentation in accordance with claim 1 wherein the sheetlike segment is provided with a plurality of loops, the steps of heating and compressing being simultaneously applied to all loops, whereby the strength of the bond between the finding and the body is multiplied.

3. A method of constructing an article of ornamentation in accordance with claim 1 wherein the loop is heated by elevating the temperature of the segment.

4. A method of constructing an article of ornamentation in accordance with claim 1 wherein the application of heat to the loop is discontinued after the fluent thermoplastic has passed through the loop.

5. A method of constructing an article of ornamentation in accordance with claim 1, wherein the segment includes an open space in an area above the loop, the step of applying compressive force being discontinued after the fluent thermoplastic occupies the space.

6. A method of constructing an article of ornamentation having a thermoplastic body, said method comprising:
   a. providing a finding having a sheetlike segment with a depressed loop,
   b. heating a zone of the body to a temperature at least the melting point of the thermoplastic,
   c. embedding the loop in the zone by applying a compressive force between the loop and the body,
   d. allowing the heated thermoplastic to solidify in interlocking engagement with the loop whereby the finding is securely anchored to the body.

7. A method of constructing an article of ornamentation in accordance with claim 6 wherein the steps of heating and embedding are simultaneous.

8. A method of constructing an article of ornamentation in accordance with claim 6 wherein the compressive force is applied until the heated thermoplastic has passed through the loop.

9. An article of ornamentation comprising a body and a finding, the finding including a sheetlike segment, means forming a pair of registered slits in an interior zone of the segment, the segment extending as a continuous loop between the slits, the loop extending beyond the plane of the segment and into the body, and the body being solidified and extending through the loop in interlocking engagement therewith, whereby the body is securely anchored to the finding and may be supported by fastening the finding to a supporting surface.

10. An article of ornamentation constructed in accordance with claim 9, wherein the area between the slits constitutes an open space in the surface of the segment, the body occupying said open space.

11. An article of ornamentation constructed in accordance with claim 9 wherein the body is formed of thermoplastic material.

* * * * *